United States Patent [19]

Losert

[11] 4,068,815

[45] Jan. 17, 1978

[54] SELF LOCKING SUPPORT MECHANISM

[75] Inventor: Gerhard K. Losert, Louisville, Ky.

[73] Assignee: General Electric Company, Louisville, Ky.

[21] Appl. No.: 762,565

[22] Filed: Jan. 26, 1977

[51] Int. Cl.² ............................................ F16M 11/24
[52] U.S. Cl. ................................................. 248/188.2
[58] Field of Search .............. 248/188.2, 188.3, 188.4, 248/188.5, 188.9, 446

[56] References Cited

U.S. PATENT DOCUMENTS

| 684,797 | 10/1901 | Day et al. ................... | 248/188.4 |
| 1,032,970 | 7/1912 | Vanderveld ................... | 248/188.2 |
| 2,204,077 | 6/1940 | Eriksson ..................... | 248/188.5 |
| 2,857,707 | 10/1958 | Caioli ....................... | 248/188.3 |
| 3,338,539 | 8/1967 | Foster ....................... | 248/188.2 |
| 3,827,663 | 8/1974 | Hinman ....................... | 248/188.3 |

FOREIGN PATENT DOCUMENTS

| 80,509 | 9/1918 | Switzerland .................. | 248/188.2 |
| 391,996 | 9/1965 | Switzerland .................. | 248/188.2 |
| 518,642 | 3/1940 | United Kingdom .............. | 248/188.2 |

*Primary Examiner*—Lawrence J. Staab
*Attorney, Agent, or Firm*—Frederick P. Weidner; Francis H. Boos

[57] ABSTRACT

A self-locking support mechanism for leveling an appliance relative to the floor that includes a support member secured to the appliance and having at least one end wall and one side wall with the side wall having a slot therethrough. There is also provided a rotatable cam member having a pivot point, a cam surface to contact the floor for height adjustment, and a radius surface relative to the pivot point. The cam member rotates by a pin through the pivot point and the slot in the support member and the pin is slidably movable within the slot. The slot and support end wall are spaced from each other and converge toward each other in a direction away from the floor. Upon rotating the cam member the pin is moved within the slot away from the floor and the cam member radius surface abuts the support end wall to lock the cam member.

4 Claims, 5 Drawing Figures

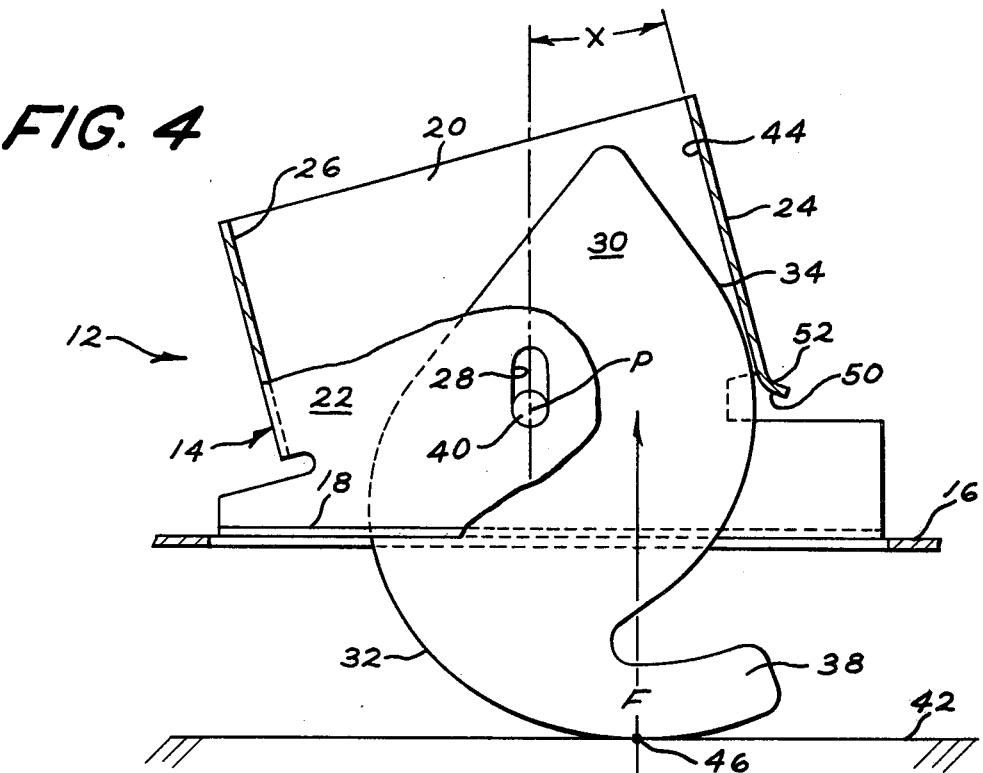
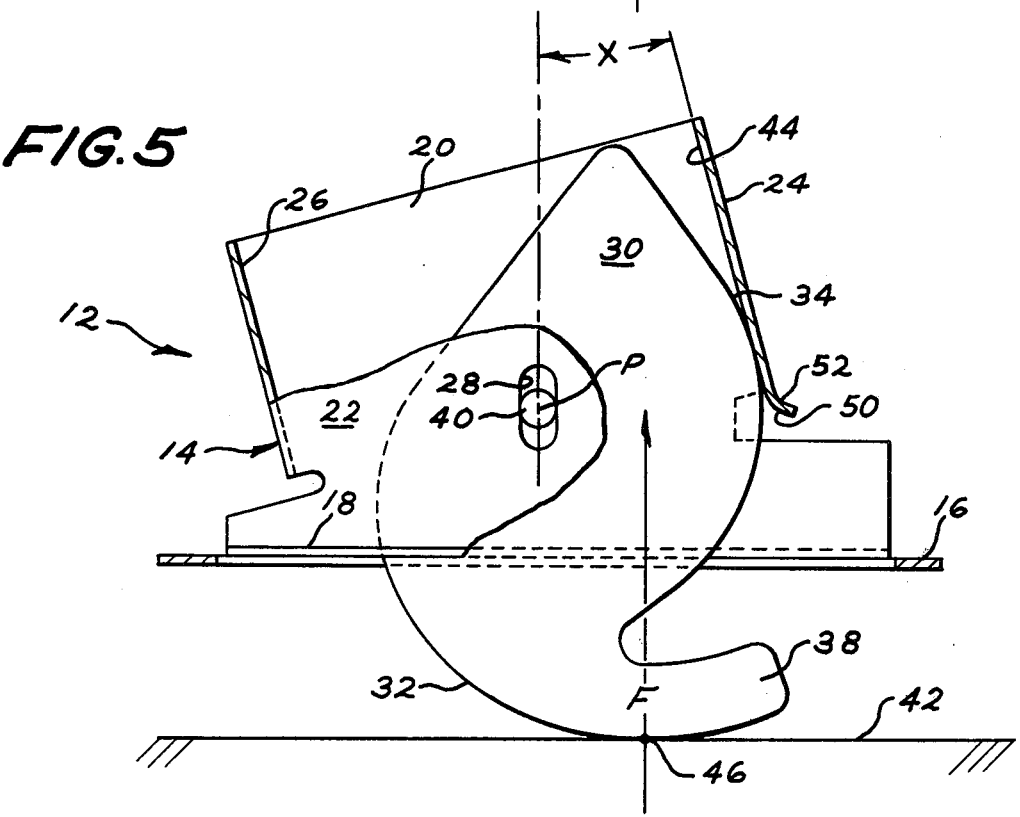

SELF LOCKING SUPPORT MECHANISM

BACKGROUND OF THE INVENTION

1. Field of the Invention

The present invention relates to machines such as automatic clothes washing machines, and more particularly, to self-locking support mechanisms for use with such machines.

2. Description of the Prior Art

In machines such as automatic clothes washing machines the weight distribution of the operational components of a machine may be unequal. Additionally, such machines are often required to stand on uneven base surfaces. In order to function properly the weight distribution of the machine should be balanced among the support contact members of the machine. This is particularly true of automatic clothes washing machines which accomplish a high speed spin or centrifugal extraction operation. If the weight distribution of this machine is not balanced, the forces generated by the rotating basket and its load of clothes and water during the spin operation may cause the machine to shake badly and to "walk" across the base surface on which the machine is standing. Since the user may move these machines during the course of their use it is highly desirable that the weight balancing mechanism for such machines be self-locking so that after movement of the machine by the user it may be easily balanced in its new location.

Various foot adjusting units for leveling appliances such as clothes washer machines and the like have been utilized in the past. For instance, there are several known ways of adjusting the feet by utilizing a cam surface one of which is shown in U.S. Pat. No. 1,032,970 wherein a screw mechanism is utilized to rotate a cammed surface that raises and lowers a foot element. There is also shown in U.S. Pat. No. 2,857,707 a device for use on furniture legs where the height of one of the legs is adjusted by a cam element, however, there is no means for locking the cam element in its desired height position. There is also shown in U.S. Pat. No. 3,338,539 a cam element which is rotated to adjust the height of a structure such as an ironing table and that cam element is retained in its proper position by a series of meshed teeth. These various leveling mechanisms are deficient in that they either do not provide for a means of locking the adjusting unit at the correct height, they require considerable manipulation to achieve the correct height adjustment, or they do not provide for infinite adjustment within a desired maximum and minimum height.

It is therefore an object of the present invention to provide an improved self-locking foot support mechanism for leveling appliances and the like relative to the base support or floor.

SUMMARY OF THE INVENTION

In accordance with the present invention there is provided a self-locking foot adjusting unit or support mechanism for leveling an appliance relative to the floor which includes a support member secured to the appliance and having at least one end wall and one side wall with the side wall having a slot therein. There is also provided a rotatable cam member having a pivot point, a cam surface to contact the floor for height adjustment, said cam surface contacting the floor at a point through which a vertical force moment is applied to the cam member. The cam member also has a radius surface relative to the pivot point and opposite from the cam surface. There is a pin through both the pivot point of the cam member and the slot in the support member side wall and is slidably movable within the slot. The slot and support end wall are spaced from and converge toward each other in a direction away from the floor and are arranged such that the vertical force moment is applied to the cam member between the pivot point and the support end wall. There is also provided a means for rotating the cam member about the pivot point. With this arrangement when the cam member is rotated the pin is moved within the slot away from the floor and the cam member radius surface abuts the support end wall to thereby lock the cam member in the desired height position by a wedging action.

BRIEF DESCRIPTION OF THE DRAWINGS

FIG. 4 is a side elevational view of the present invention similar to FIG. 3 showing the self-locking support mechanism in its highest or maximum height adjustment position relative to the floor.

FIG. 5 is a side elevational view of the self-locking support mechanism of the present invention similar to FIG. 4 and showing the mechanism in its locked position.

DESCRIPTION OF THE PREFERRED EMBODIMENT

Figure 1:
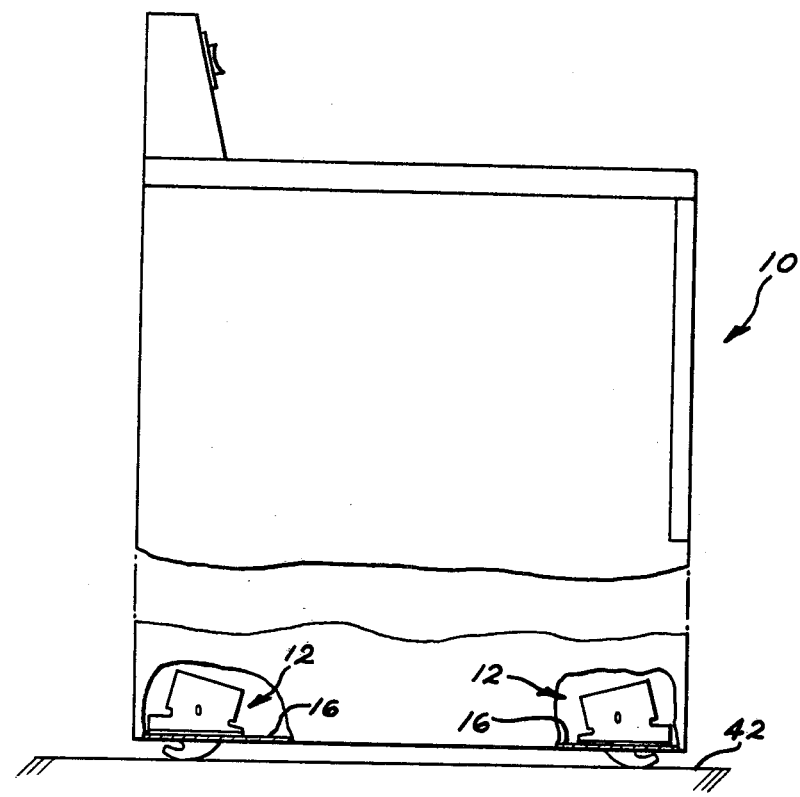
FIG. 1 is a side elevational schematic view of a clothes washing machine incorporating the self-locking support mechanism of the present invention, the view being partly broken away to show the self-locking support mechanism.

Referring now to FIG. 1, the clothes washer machine schematically illustrated is generally indicated by the numeral 10. The self-locking foot adjusting unit or support mechanism 12 is shown at both the front and back corners of the machine. A self-locking support mechanism may be employed at all four corners of the machine or they may be employed at less than all four corners depending upon the design requirements. In some cases only one such self-locking support mechanism may be sufficient.

Figure 2:
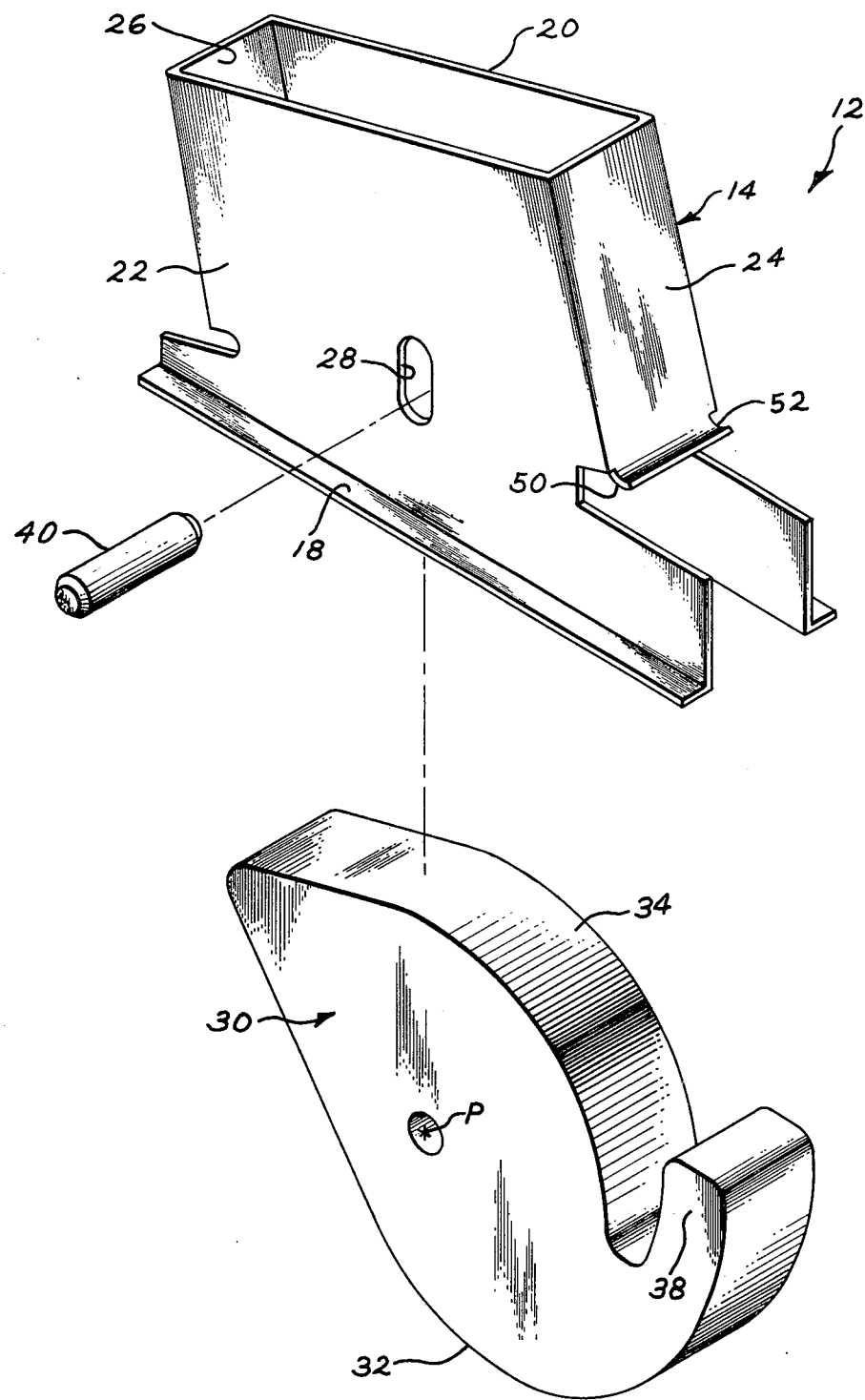
FIG. 2 is an exploded perspective view showing the self-locking support mechanism of the present invention.

With particular reference to FIG. 2 the structural arrangement of the self-locking support mechanism will now be discussed in detail. There is provided a support member 14 which is secured to the clothes washer 10 by any suitable means such as by bolting or welding the support member 14 to a stationary structural element of the clothes washer 10 such as base member 16 shown in FIG. 1. For ease of securement there is provided at the bottom of the support member 14 outwardly directed flanges 18 to provide an adequate surface area of the support member 14 for securely attaching it to the base member 16 of the clothes washing machine. The support member 14 has, in the preferred embodiment, two side walls 20 and 22 and two end walls 24 and 26. The side walls 20 and 22 each having a slot 28 therethrough.

There is a rotatable cam member 30 that has a cam surface 32 to contact the floor for height adjustment and on the opposite side of the cam member 30 is a radius surface 34 which is radiused relative to a pivot point 36 of the cam member 30. That is, all points on the radius surface 34 are equidistance from the pivot point 36. The rotatable cam member 30 also has means for rotating the cam member in the form of a projection 38 which is located between the cam surface 32 and the radius surface 34 and extends outwardly of the support member 14 for access to manually rotate the cam member as will be more fully described later.

A pin 40 passes through the cam member 30 at pivot point 36 and the slots 28 in both the side walls 20 and 22 of the support member 14. By this arrangement then the cam member 30 is rotatable about pivot point 36 by means of pin 40 and is retained partially within the support member 14.

Figure 3:
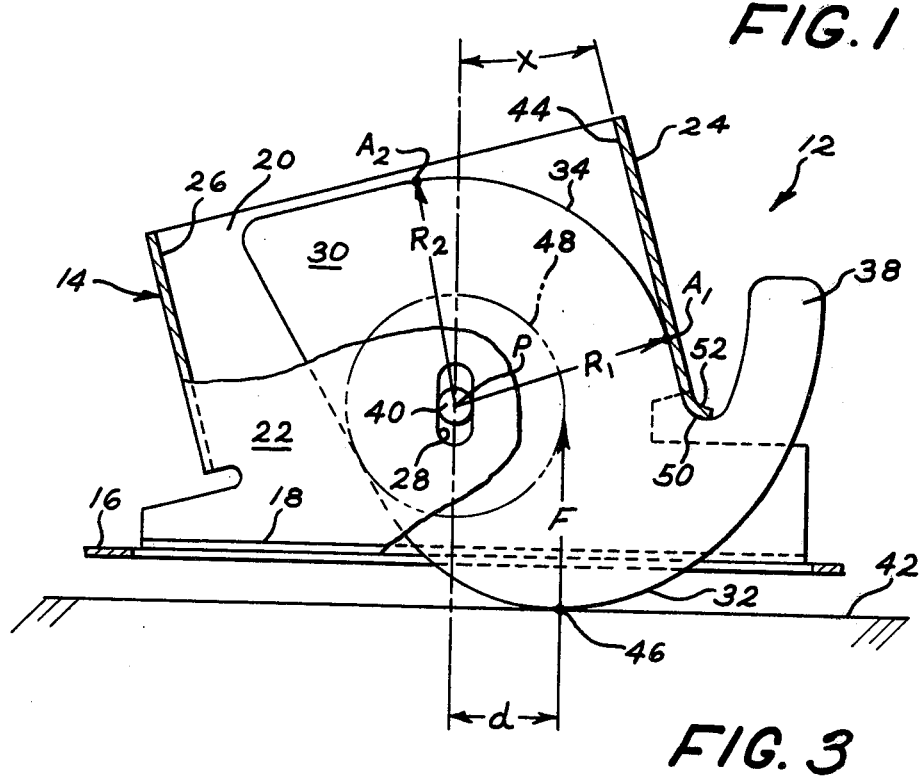
FIG. 3 is a side elevational view of the self-locking support mechanism of the present invention, the view being partly broken away and showing the mechanism in its lowest minimum height position relative to the floor.

With reference particularly to FIG. 3, the relationship of the various structural elements of the self-locking support mechanism 12 will be described. FIG. 3 shows the self-locking support mechanism 12 in its lowest or minimum height adjustment relative to the floor surface 42. The slot 28 and the end wall 24 of the support member 14 are arranged such that they converge toward each other in a direction away from the floor 42. There is thus provided an included angle "X" as shown by lines drawn longitudinally through the slot 28 and the inside surface 44 of the end wall 24. The radius surface 34 extends from point $A_1$ to point $A_2$ with the radius distance from pivot point "P" being $R_1$ and $R_2$, respectively. It will be noted in FIG. 3 that radius surface 34 abuts inside surface 44 of end wall point 24 at point $A_1$. In this position the cam member 30 cannot be moved upwardly relative to support member 14 as it is wedged by pin 40 in slot 28 and the radius surface 34 abutting the inside surface 44 of end wall 24 as a result of the converging angle "X" formed by these two elements.

Cam surface 32 is designed so that the vertical force moment designated "F" that passes through point 46 where the cam surface 32 contacts the floor 42 provides the same force moment around pivot point "P". This may be accomplished by drawing an imaginary circle 48 and having all points on the cam surface 32 perpendicular to a line drawn tangent to the imaginary circle 48. In this manner then the force moment "F" will always be equidistance from the pivot point "P" and that distance is designated "d" in FIG. 3. By this arrangement the force moment "F" will always be vertical and perpendicular to the floor 42 and pass through point 46 to intersect the line $R_1$ between point $A_1$ and pivot point "P" at approximately the center thereof. In any event, the force moment "F" must intersect $R_1$ somewhere between point $A_1$ and point "P" in order for the self-locking support mechanism 12 to function.

The rotatable cam member 30 also has means for limiting its rotation about pivot point "P" and thereby provide minimum and maximum height adjustment of the self-locking support mechanism 12. The minimum or low height adjustment limit is provided by the portion 50 of the cam member between the radius surface 34 and the projection 38 abutting against the bottom flanged portion 52 of the end wall 24 of the support member 14. This abuttment position is shown in FIG. 3 and it will be understood that rotation of the cam member 30 in a counter clockwise direction as viewed in FIG. 3 is thereby prevented. The maximum height adjustment is provided by the cam member 30 having an extending surface 54 which is spaced from pivot point "P" a greater distance than the radius surface 34 is, which distance is designated as $R_1$ and $R_2$. Rotation of the cam member 30 in a clockwise direction as viewed in FIG. 3 will extend throughout the segment of the radius surface 34 between points $A_1$ and $A_2$ but will thereafter be prevented from clockwise rotation by extending surface 54 abutting against inside surface 44 of the end wall 24. The height adjustment between minimum and maximum may be changed by changing the length of the radius surface 34 between $A_1$ and $A_2$.

With reference particularly to FIGS. 4 and 5 the operation of the self-locking support mechanism 12 will be discussed. FIG. 4 shows the support mechanism 12 in a position where the clothes washing machine is raised to its desired elevation relative to the floor 42 with base member 16 being spaced from the floor 42. In this position the cam surface 32 is in contact with the floor at point 46 through which force moment "F" passes perpendicular and vertical to the floor 42. The pin 40 is in its lowermost position within slot 28 and radius surface 34 of the cam member is not in contact with the inside surface 44 of the end wall 24. In this position then the self-locking support mechanism 12 is not locked as it can readily be seen that there is no wedging action of the cam member 30 between the pivot point "P" and the inside surface 44 of end wall 24 of the support member 14. Thus, the cam member 30 may be rotated about machine 10 and its base member 16 are maintained at the desired spaced relationship from the floor 42 and while so maintained the projection 38 of cam member 30 may by any manual means, such as by a person's hand or foot, be caused to be pushed clockwise, as viewed in FIGS. 4 and 5 thus rotating the cam member 30 accordingly. During this rotational movement the cam member 30 and pin 40 are caused to move upwardly away from the floor 42 within the slot 28. Because of this upward movement the cam member radius surface 34 is caused to abut the inside surface 44 of the end wall 24 as shown in FIG. 5 since the pin 40 and inside surface 44 converge toward each other as described previously. Thus, by rotating the cam member there is a wedging action between the pin 40 within the slot 28 and the point of abuttment between the radius surface 34 and the inside surface 44 of the end wall 24. This wedging action causes the cam member 30 to be locked relative to the support member 14 and the clothes washing machine is now adjusted at its proper height relative to the floor 42 and the adjusting unit is in its locked stable position. To unlock the support mechanism 12 the clothes washing machine is simply lifted upwardly and the cam member 30 rotated counter-clockwise to counteract the wedging action.

The foregoing has been a description of the preferred embodiment of the invention, however, it is to be understood that using the principles of the self-locking support mechanism it will be understood that the invention may be accomplished by the support member 14 having only one side wall 24 and one slot 28 therethrough. However, the preferred embodiment uses two side walls to add rigidity to the self-locking support mechanism 12 and provide for more easy manufacture and assembly of the unit.

The foregoing is a description of the preferred embodiment of the invention and variations may be made thereto without departing from the true spirit of the invention as defined by the appended claims.

What is claimed is:

1. A self-locking support mechanism for leveling an appliance relative to the floor, comprising:
   a. a support member secured to the appliance and having at least one end wall and one side wall, said side wall having a slot;
   b. a rotatable cam member having:
      i. a pivot point,
      ii. a cam surface to contact the floor for height adjustment, said cam surface contacting the floor at a point through which a vertical force moment is applied to the cam member,
      iii. a radius surface relative to the pivot point and opposite the cam surface;
   c. a pin through the pivot point of the cam member and the slot in the support member side wall and slidably movable within the slot, said slot and support end wall being spaced from and converging toward each other in a direction away from the floor and arranged such that the vertical force moment is applied to the cam member between the pivot point and the support end wall; and
   d. means for rotating the cam member, whereby upon rotating the cam member the pin is moved within the slot away from the floor and the cam member radius surface abuts the support end wall to lock the cam member.

2. The self-locking support mechanism of claim 1 wherein the support member has two opposing side walls, each having a slot and the pin passes through both, with the cam member located therebetween.

3. The self-locking support mechanism of claim 1 wherein the cam member has stop means in association with the support member for limited rotation of the cam member to provide maximum and minimum height adjustment of the mechanism.

4. The self-locking support mechanism of claim 1 wherein the means for rotating the cam member is a projection on the cam member between the cam surface and the radius surface and extending outwardly of the support member for access to manually rotate the cam member.

* * * * *